United States Patent
Lebold

(10) Patent No.: US 6,494,041 B1
(45) Date of Patent: Dec. 17, 2002

(54) TOTAL PRESSURE EXHAUST GAS RECIRCULATION DUCT

(75) Inventor: Robert Shawn Lebold, Indianapolis, IN (US)

(73) Assignee: BorgWarner, Inc., Troy, MI (US)

( * ) Notice: Subject to any disclaimer, the term of this patent is extended or adjusted under 35 U.S.C. 154(b) by 0 days.

(21) Appl. No.: 09/897,247

(22) Filed: Jul. 2, 2001

(51) Int. Cl.[7] ............................................... F02B 33/44
(52) U.S. Cl. ............... 60/605.2; 123/568.17; 123/568.18; 123/568.21; 251/298
(58) Field of Search ............ 60/605.2; 123/568.17, 123/568.18, 568.21, 568.23, 568.24; 251/298

(56) References Cited

U.S. PATENT DOCUMENTS

| | | | | |
|---|---|---|---|---|
| 1,568,410 A | * | 1/1926 | Minter | 251/298 |
| 3,773,062 A | * | 11/1973 | McIver | 251/298 |
| 4,222,356 A | * | 9/1980 | Ueda et al. | 123/568.18 |
| 5,533,487 A | | 7/1996 | Cailey | |
| 6,000,222 A | * | 12/1999 | Regnier | 60/605.2 |
| 6,089,019 A | * | 7/2000 | Roby et al. | 60/605.2 |
| 6,216,677 B1 | * | 4/2001 | McConnell et al. | 123/568.24 |
| 6,263,672 B1 | * | 7/2001 | Roby et al. | 60/605.2 |
| 6,311,494 B2 | * | 11/2001 | McKinley et al. | 60/605.2 |
| 2001/0032467 A1 | * | 10/2001 | Martin | 60/605.2 |

FOREIGN PATENT DOCUMENTS

| | | | | |
|---|---|---|---|---|
| JP | 357129245 A | * | 8/1982 | 60/605.2 |
| JP | 08284763 A | * | 10/1996 | 60/605.2 |

* cited by examiner

*Primary Examiner*—Thomas Denion
*Assistant Examiner*—Thai-Ba Trieu
(74) *Attorney, Agent, or Firm*—Pendorf & Cutliff; Greg Dziegielewski

(57) ABSTRACT

A total pressure exhaust gas recirculation duct system includes a turbocharger having a turbine inlet scroll, an exhaust gas recirculation duct and a valve assembly disposed between a port and inlet scroll and the inlet to the exhaust gas recirculation duct. The valve is situated so that the valve blade member extends from the inlet scroll port into the exhaust gas stream to divert a portion of the exhaust gas into the EGR duct. The valve has a pivot shaft disposed within a corresponding channels of the inlet scroll housing and the EGR duct with a free end extending beyond the inlet scroll and the EGR duct for actuation of the valve. Alternatively, the valve can include a blade element attached to the distal end of an actuating rod and positioned in the port of the inlet scroll. The proximal end of the actuation rod extends through a passageway in the EGR duct or the inlet scroll for actuation of the valve. An electronic control unit actuates the valve in conjunction with pressure sensors monitoring intake gas and exhaust gas pressures and other engine condition sensors. The volume of exhaust gas diverted to the EGR duct is varied to maintain the pressure of the diverted exhaust gas at an appropriate level for mixing with the intake gas.

20 Claims, 8 Drawing Sheets

TOTAL PRESSURE EXHAUST GAS RECIRCULATION DUCT

BACKGROUND OF THE INVENTION

The present invention relates to an exhaust gas recirculation system for an engine with a turbocharger.

Recirculation of exhaust gas into the intake gas of an internal combustion engine is widely recognized as a significant method for reducing the production of nitrous oxides ($NO_x$) during the combustion process. The recirculated exhaust gas partially quenches the combustion process and lowers the peak temperature produced during combustion. Since $NO_x$ formation is related to peak temperature, recirculation of exhaust gas reduces the amount of $NO_x$ formed.

In a normally aspirated internal combustion engine, the intake gas is usually at a lower pressure than the exhaust gas. Under this condition, the introduction of exhaust gas into the intake gas can be performed without difficulty.

However, in a turbocharged internal combustion engine, the pressure relationship between intake and exhaust gasses is often reversed. In a conventional manner, the turbocharger accepts exhaust gas from the engine and using energy from the exhaust gas stream, produces power in a turbine which is used to drive a compressor. The compressor increases the pressure of intake gas being accepted by the engine. The pressure of the intake gas at the compressor discharge, or compressor outlet, is variable, and is related to, among other things, the amount of power being provided by the turbine. The power delivered by the turbine depends upon the temperature and pressure of the exhaust gas, as well as other factors.

Under some operating conditions, such as a diesel engine producing peak torque, the pressure of the intake gas is higher than the pressure of the exhaust gas. Because of this adverse pressure gradient, exhaust gas does not recirculate into the intake unaided.

Various systems have been proposed to provide recirculated exhaust gas for an engine with a turbocharger. In one design, a butterfly-type valve is placed at the exhaust of the turbine so as to backpressure the exhaust system. However, this backpressuring of the turbine results in a thrust load on the turbocharger rotor system which increases wear of the turbocharger bearings. Furthermore, exhaust gas under pressure may leak past the seals and bearings of the turbocharger and flow with the returned lubricating oil into the crankcase of the engine, undesirably increasing engine crankcase pressure.

In yet another design, a combination backpressure/EGR valve is provided at the turbine inlet. In this valve, the actuation of the backpressure valve is mechanically locked to the actuation of the EGR valve. This valve does not include flexibility to change the backpressuring of the exhaust system independently of the recirculation of exhaust gas. This lack of flexibility means that the amount of exhaust gas recirculated may be optimized for a single or narrow range of conditions, and would be non-optimum for most conditions. Also, such a combination valve does not permit backpressuring of the exhaust system during cold start up of the engine without also permitting a high degree of recirculated exhaust gas flow. Such a combination valve would be less than optimum for reduction of white smoke from a diesel engine during cold starting and warm-up.

In another approach, U.S. Pat. No. 5,533,487 discloses an EGR system that attempts to take advantage of both static and dynamic pressure in the EGR system. However, the system relies on specially designed exhaust and inlet ductwork for effective functioning of the system which limits its applicability and flexibility.

A need remains for an exhaust gas recirculation system that provides improvements to current systems and is readily adaptable to existing engine systems.

SUMMARY OF THE INVENTION

The present invention provides a total pressure exhaust gas recirculation duct. The system includes a turbocharger for increasing the pressure of the intake gas to the engine. The turbocharger has a turbine inlet scroll that includes a port for diverting a portion of the exhaust gas to the engine intake gas. The diverted exhaust gas from the turbine inlet scroll is conducted to the engine's intake system through an exhaust gas recirculation duct attached to the scroll. The exhaust gas recirculation duct has an inlet juxtaposed to the port in the inlet scroll. A scoop valve assembly is disposed between the inlet scroll port and the exhaust gas recirculation duct and operates to either prevent or allow exhaust gas flow from the turbine inlet scroll to the exhaust gas recirculation duct. The system may also include an exhaust gas recirculation valve to meter the flow of exhaust gas into the intake gas stream.

In a preferred embodiment, the scoop valve assembly includes an elongated pivot shaft disposed between the scroll and the inlet duct and having at least one free end extending from the scroll and exhaust gas recirculation gas duct assembly. A valve member is attached to the pivot shaft and rotates with the shaft. The valve member has a blade element that is receivable in the port in the inlet scroll. In its open position the valve blade element extends into the exhaust gas stream and diverts a portion of the exhaust gas into the exhaust gas recirculation duct. In a closed position, the valve member seals against the inlet to the exhaust gas recirculation duct thus preventing entry of any of the exhaust gas. A cap and seal can be installed on the pivot shaft's free end. In a most preferred embodiment, the valve assembly also includes high temperature sleeves to insulate the pivot shaft.

In another version of the invention, the scoop valve assembly includes a blade element positioned in the inlet scroll port and configured to seal the inlet of the exhaust gas recirculation duct when the valve is in a closed position. A valve actuating rod has a distal end attached to the blade element and a proximal end that extends through a passage way providing in either the inlet scroll or the exhaust gas recirculation duct. The actuation rod is slidably movable in the passageway to move the blade element between the open and closed positions. In this embodiment, the passageway preferably includes a guide for the actuating rod and a seal to prevent leakage of the exhaust gas from the passageway.

In yet another version of the invention, there is provided an exhaust gas recirculation system including a turbocharger having an inlet scroll, an exhaust gas recirculation duct attached to the scroll, and a scoop valve assembly between the scroll and duct operable to allow or inhibit exhaust gas flow from the scroll. This embodiment of the invention further includes sensors for monitoring the pressure of the intake gas and the exhaust gas. A controller monitors these pressure signals and then actuates the scoop valve assembly to provide exhaust gas for mixing with the intake gas at an appropriate pressure.

In still another embodiment, the exhaust gas recirculation duct is integral with the inlet scroll.

It is an object of the invention to provide an exhaust gas recirculation duct that uses the kinetic energy of the exhaust gas flow to develop a total pressure sufficient for admission of exhaust gas into the intake system through the EGR valve.

It is another object to provide a duct that allows the EGR function and engine back pressure control to be accomplished independently of each other.

These and other objects and advantages of the present invention will be apparent from the following descriptions of the preferred embodiments and drawings.

DESCRIPTION OF THE FIGURES

FIG. 7A is a cross sectional view of the valve blade of FIG. 7.

DESCRIPTION OF THE PREFERRED EMBODIMENTS

Figure 1:
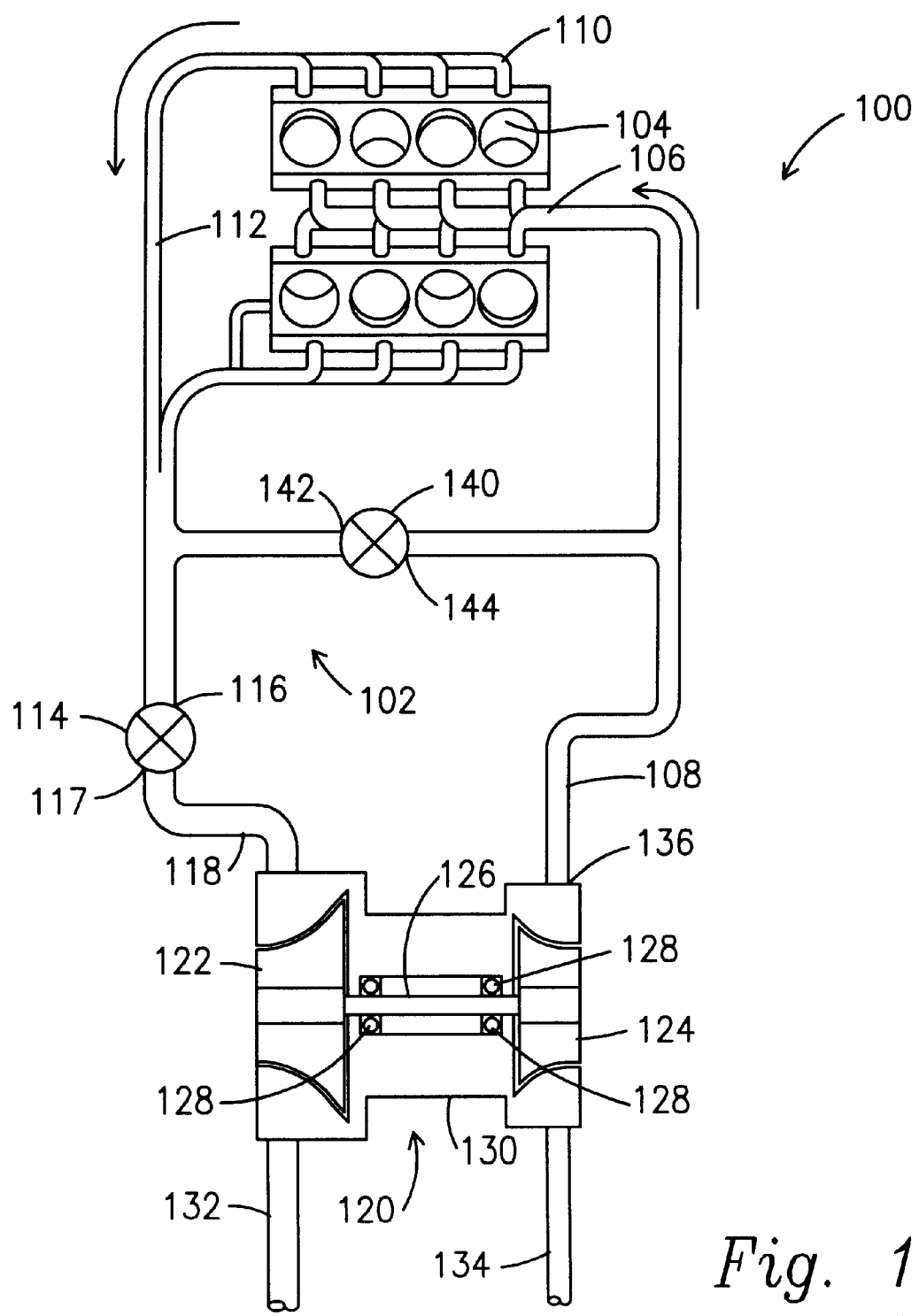
FIG. 1 is a schematic of a conventional turbocharged internal combustion engine illustrative of the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

The present invention relates to a duct system for recirculating exhaust gas of an internal combustion engine from the exhaust passageways to the intake passageways.

FIG.1 schematically represents a turbocharged internal combustion engine 100 with a typical exhaust gas recirculation system 102. The engine is also equipped with a turbocharger generally represented at 120. Engine 100 includes one or more cylinders 104 for producing power. Each cylinder 104 is provided intake gas through an intake manifold 106 fed by an intake duct 108. Combustion of fuel and the intake gas within the cylinder produces exhaust gas which exits the cylinder 104 into an exhaust manifold 110. The exhaust gas flows through manifold 110 and into exhaust duct 112.

Exhaust gas in exhaust duct 112 is provided to EGR system 102, which may include a restrictor valve 114 and an EGR valve 140. Restrictor valve 114 is capable of varying flow resistance in exhaust duct 112 in response to an input from a controller, not shown. The controller is preferably part of or embodied in an engine control module (ECM) that preferably controls all functional components of the engine. The variable flow resistance correspondingly varies the pressure of the exhaust gas within duct 112 and the pressure of exhaust gas provided to the inlet 142 of EGR valve 140.

EGR valve 140 provides a means for controlling the flow of recirculated exhaust gas to be provided to intake duct 108, also, in response to an input from the controller or ECM. The outlet 144 of EGR valve 140 is preferably in fluid communication with both outlet 136 of turbocharger compressor 124 and intake manifold 106.

A portion of exhaust gas in duct 112, enters inlet 116 of restrictor valve 114 and passes through to valve outlet 117. Outlet 117 delivers the exhaust gas to turbine inlet duct 118 which provides the exhaust gas to turbine 122 of turbocharger 120.

Turbine 122 drives a compressor 124 through rotor shaft 126 which is supported by bearings 128 within turbocharger housing 130. Compressor 124 is provided intake gas through inlet duct 134. Compressed intake gas is delivered to compressor outlet 136 and thereafter to intake duct 108.

Figure 2:
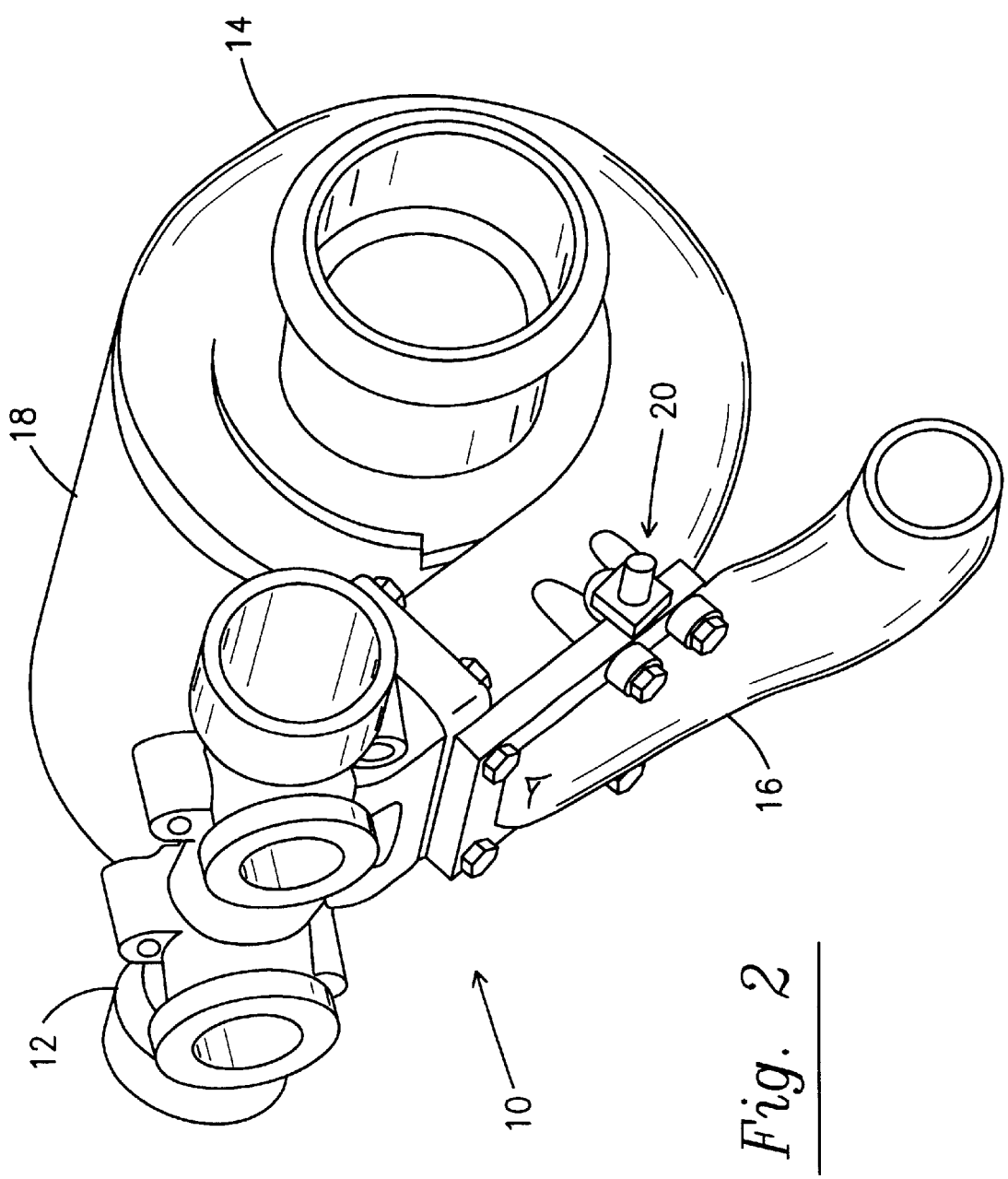
FIG. 2 is a perspective view showing a turbocharger with a total pressure EGR duct system according to one embodiment of the present invention.

Turning now to FIG. 2 a total pressure exhaust gas recirculation duct system according to one embodiment of the present invention is depicted. The system includes a turbine inlet scroll 14, an exhaust gas recirculation (EGR) duct 16 and a scoop valve assembly generally indicated at 20. In FIG. 2 the inlet scroll is shown attached to turbocharger housing 18 and with exhaust manifold 12 attached to the inlet scroll 14.

Figure 3:
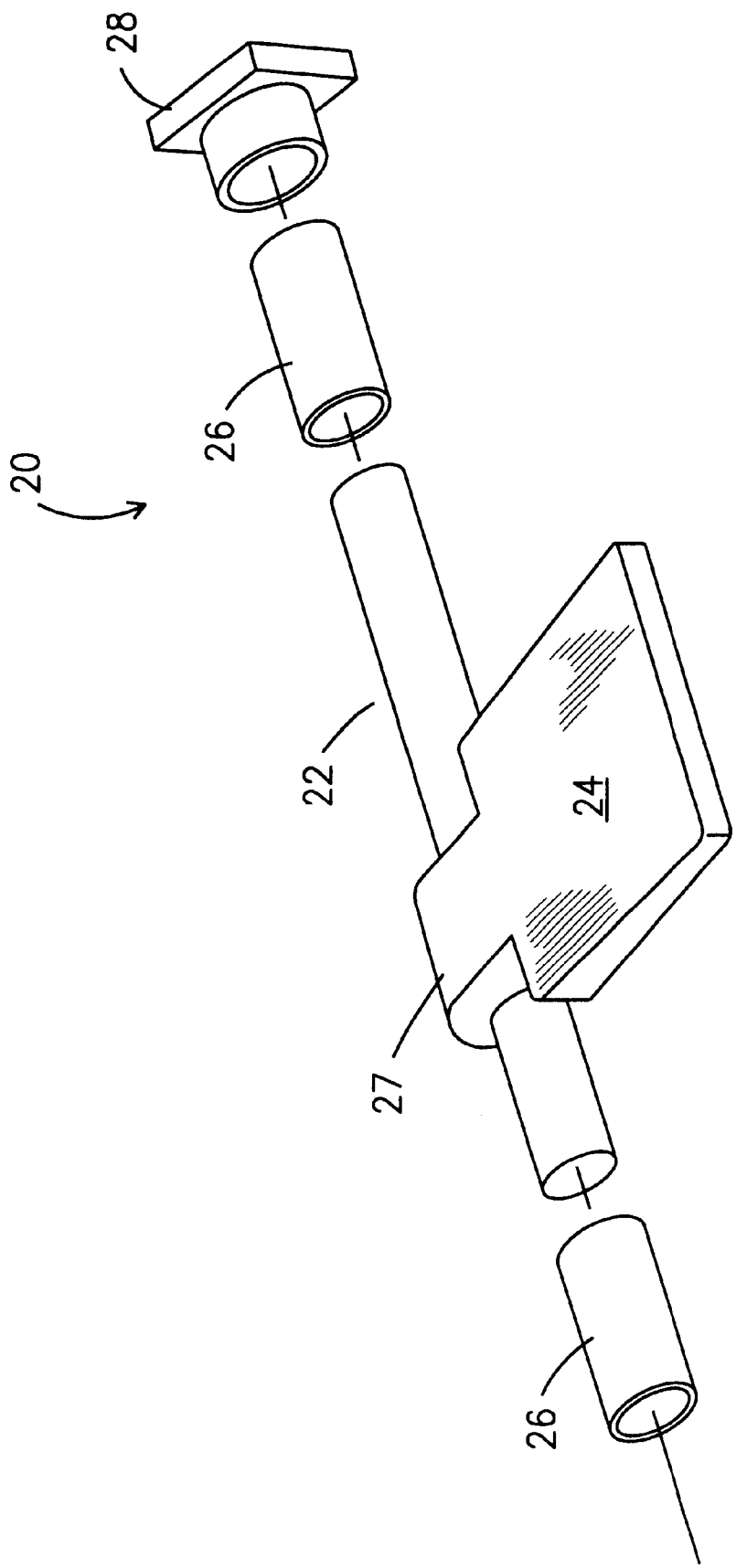
FIG. 3 is an exploded perspective view of a scoop valve assembly according to one embodiment of the present invention.

With reference to FIG. 3, the detailed construction of certain components of the valve assembly is shown. Scoop valve assembly 20 includes pivot shaft 22 to which is attached to paddle 24 through the neck portion 27 of paddle 24. Paddle 24 is preferably fixedly attached to pivot shaft 22 for rotation therewith. The assembly also preferably includes high temperature sleeves 26, which are installed over the ends of pivot shaft 22 to insulate the pivot shaft 22. Finally, the scoop valve assembly includes cap and seal 28, which seals against gas leakage between the pivot shaft 22 and the pivot shaft channels 38 and 46 shown in FIGS. 4 and 5 respectively. The cap and seal 28 can be held in place by any of several available means well known in the art such as by snap rings or threaded attachment.

Figure 4:
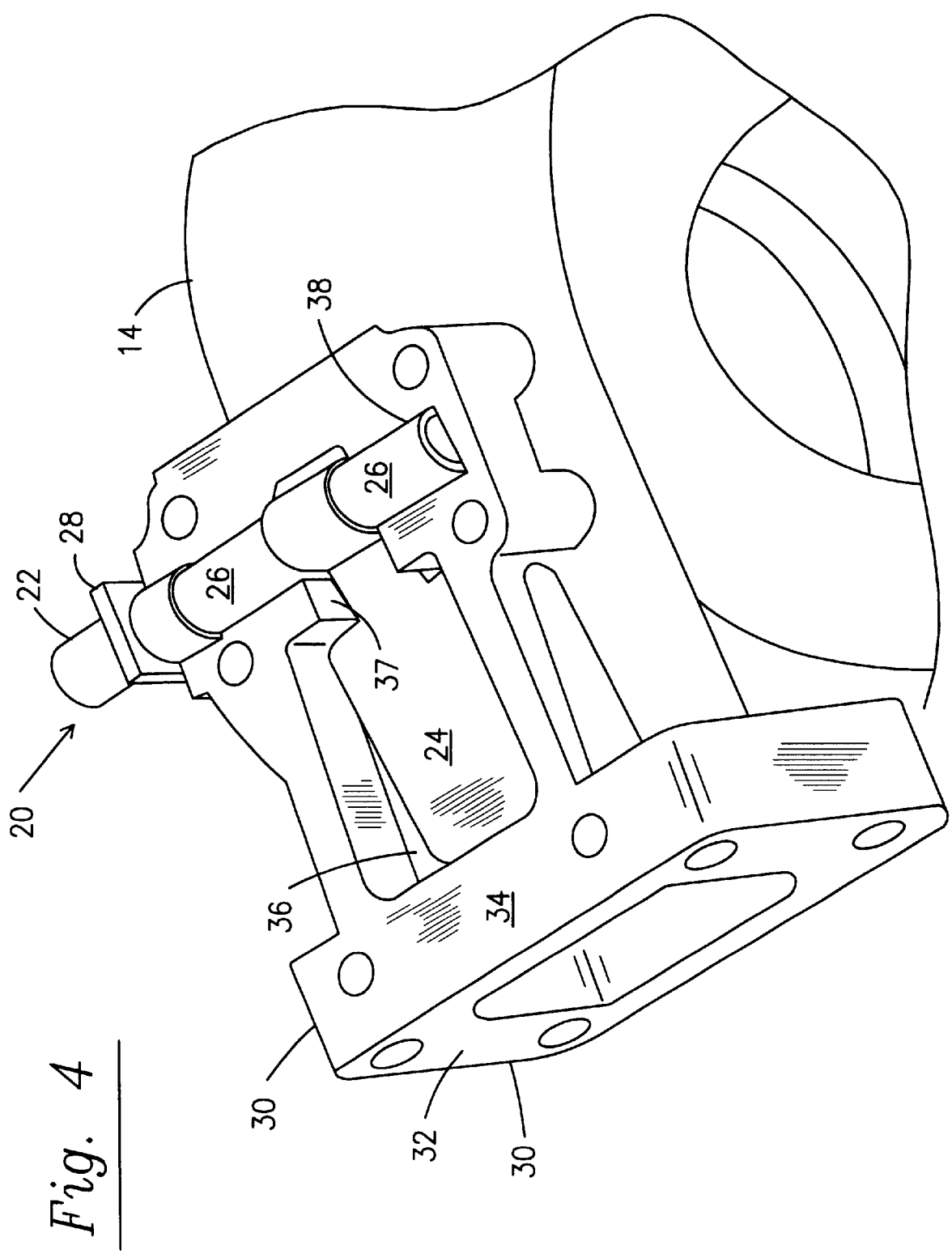
FIG. 4 is a perspective view of the scoop valve assembly and turbine scroll of the assembly of FIG. 2.

Turning now to FIG. 4, the turbine inlet scroll is depicted with the exhaust manifold and the EGR duct removed. The inlet scroll 14 includes a mounting flange 30 that provides a mounting surface 32 for the exhaust manifold and mounting surface 34 for the EGR duct. Scoop valve assembly 20 is supported in the pivot shaft channel 38 defined in the mounting surface 34. Valve paddle 24 is shown positioned in port 36 of inlet scroll 14. The scroll mounting surface 34 includes a slot 37 between the port 36 and the pivot shaft channel 38 which receives the neck portion 27 of paddle 24.

Figure 5:
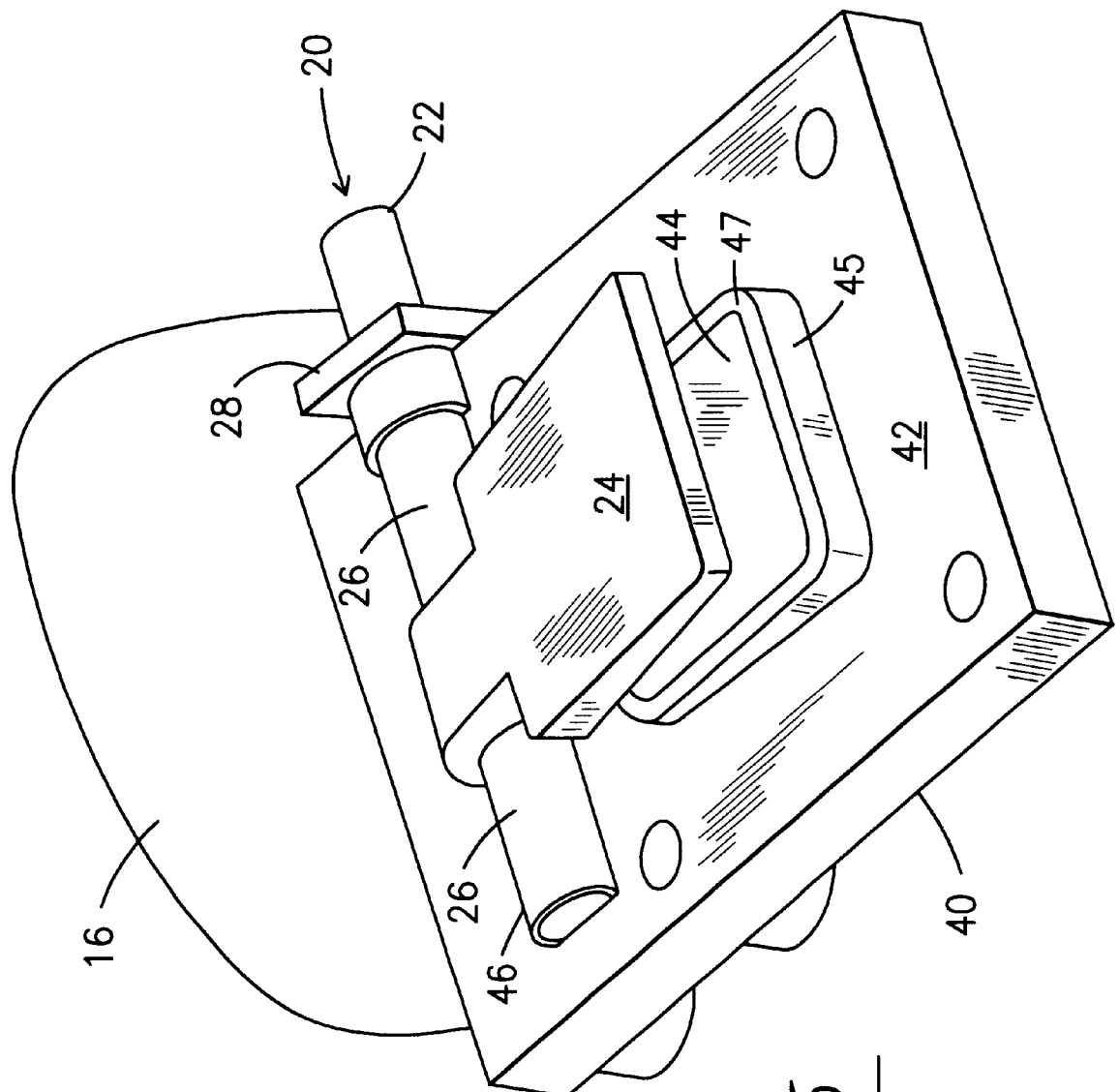
FIG. 5 is a perspective view of the scoop valve assembly and EGR duct inlet of the assembly of FIG. 2.

Turning now to FIG. 5, the scoop valve assembly 20 is shown in relation to the EGR duct 16. Valve pivot shaft 22 and sleeves 26 are shown positioned in channel 46 of a duct flange 40. The flange 40 is configured to be mounted on the mounting surface with inlet 44 in communication with port 36. Valve paddle 24 is shown in relation to EGR duct inlet 44. The duct inlet 44 is surrounded by an upraised sealing wall 45 which preferably has a chamfered sealing edge 47 that engages the valve paddle 24 when the valve is closed.

Figure 6:
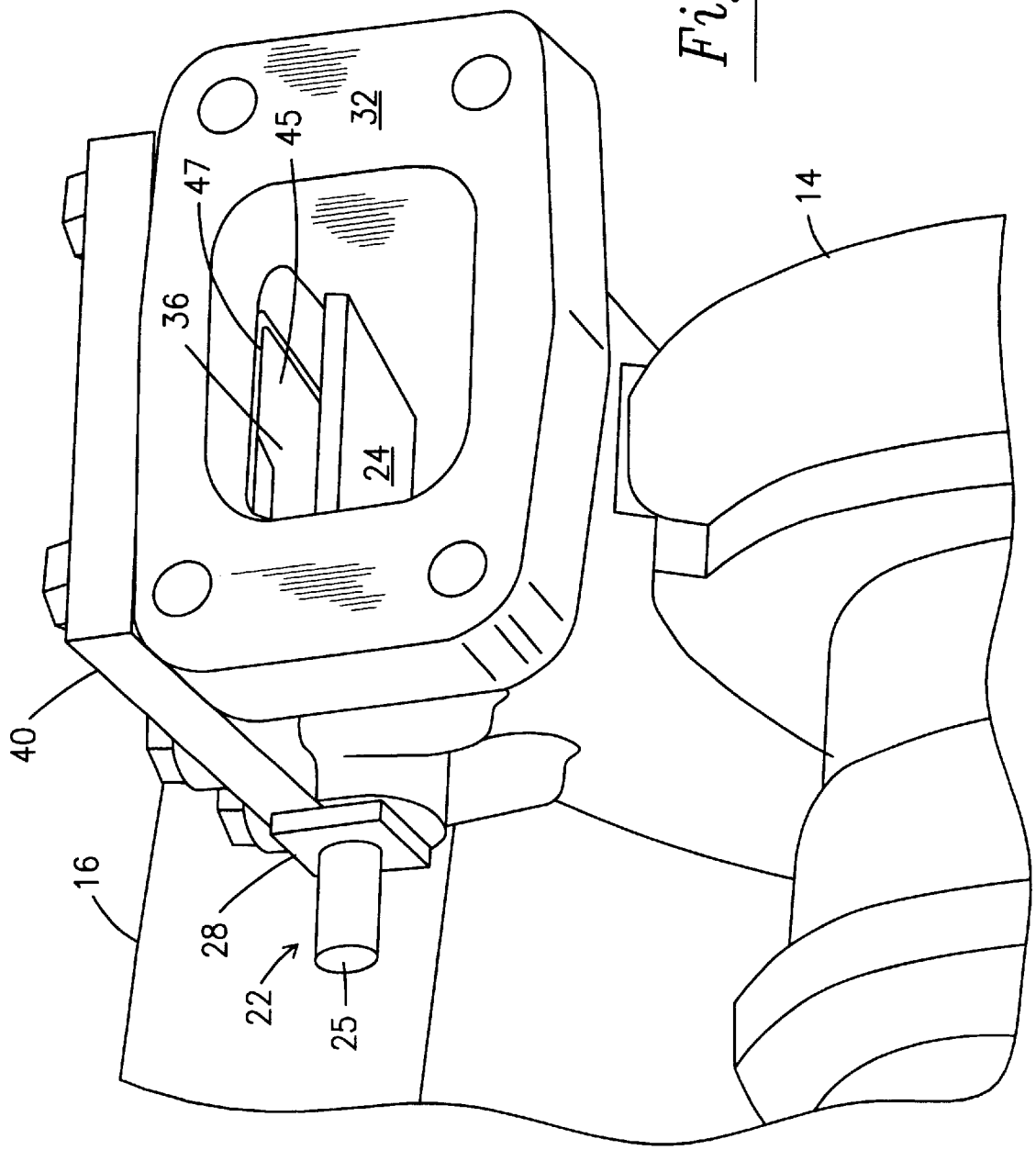
FIG. 6 is a perspective view, taken from the exhaust manifold mounting surface, of the assembled turbine inlet scroll, scoop valve assembly, and EGR duct of FIG. 2.

The assembled turbine inlet scroll 14, EGR duct 16, and scoop valve assembly 20 comprise the total pressure exhaust gas recirculation duct system and is shown assembled in FIG. 6. Viewed from the exhaust manifold-mounting surface 32, paddle 24 is shown in relation to port 36 of inlet scroll 14. The interior of the sealing wall 45 and a portion of the chamfered sealing edge 47 can also be seen.

The free end 25 of pivot shaft 22 is shown extending from the coupled EGR duct 16 and inlet scroll 14. In an alternative embodiment of the EGR duct system, EGR duct 16 can be integrally formed with inlet scroll 14. The pivot shaft free end 25 can be configured to engage an actuator or linkage that is manipulated by the controller. A variable motor or actuator can be used to rotate the shaft and thereby the valve paddle, by controllable amounts.

Figure 7:
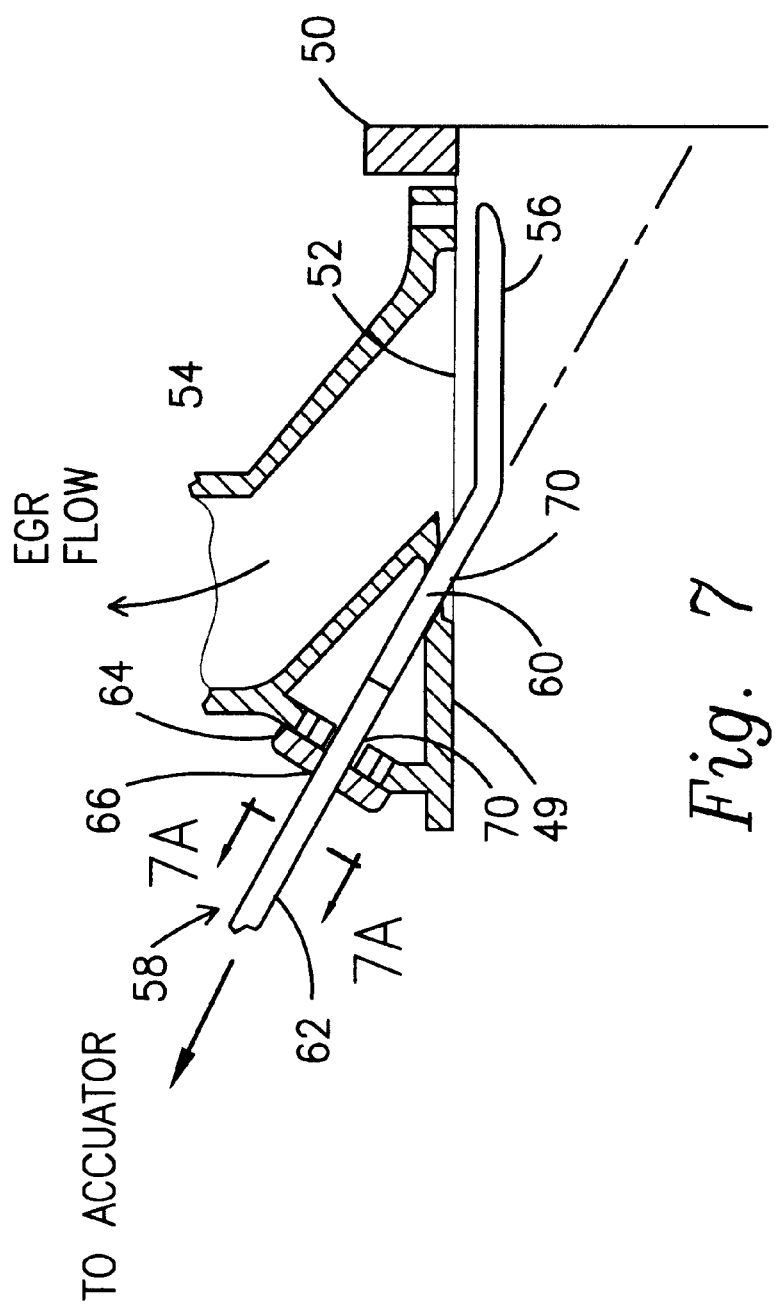
FIG. 7 is a side elevational view of another embodiment of a scoop valve according to the present invention.

Another embodiment of the scoop valve is shown in FIG. 7. In this cutaway view, inlet scroll 49 is shown including an inlet 50 for receiving exhaust gas and a port 52 through which exhaust gases can be diverted. Exhaust gas recirculation duct 54 is shown attached to inlet scroll 49 to receive any diverted exhaust gas. Valve blade 56 is attached to the distal end 60 of actuating rod 58. In FIG. 7A, a cross section of valve blade 56 is shown for perspective. Actuating rod proximal end 62 is shown projecting from passageway 70 in the inlet scroll. Alternatively, the valve mechanism could be repositioned so that the valve is actuated through a passageway in EGR duct 54. The assembly also includes an actuating rod guide 64 which includes seal 66 which prevents leakage of exhaust gas through the passageway 70. In this embodiment, sliding actuating rod 58 through passageway 70 actuates valve blade 56. In its open position, blade 56 extends into the exhaust gas stream diverting a portion of the exhaust gas into EGR duct 54. Here again, in an alternative embodiment of the system, EGR duct 54 can be integrally formed with inlet scroll 49.

Figure 8:
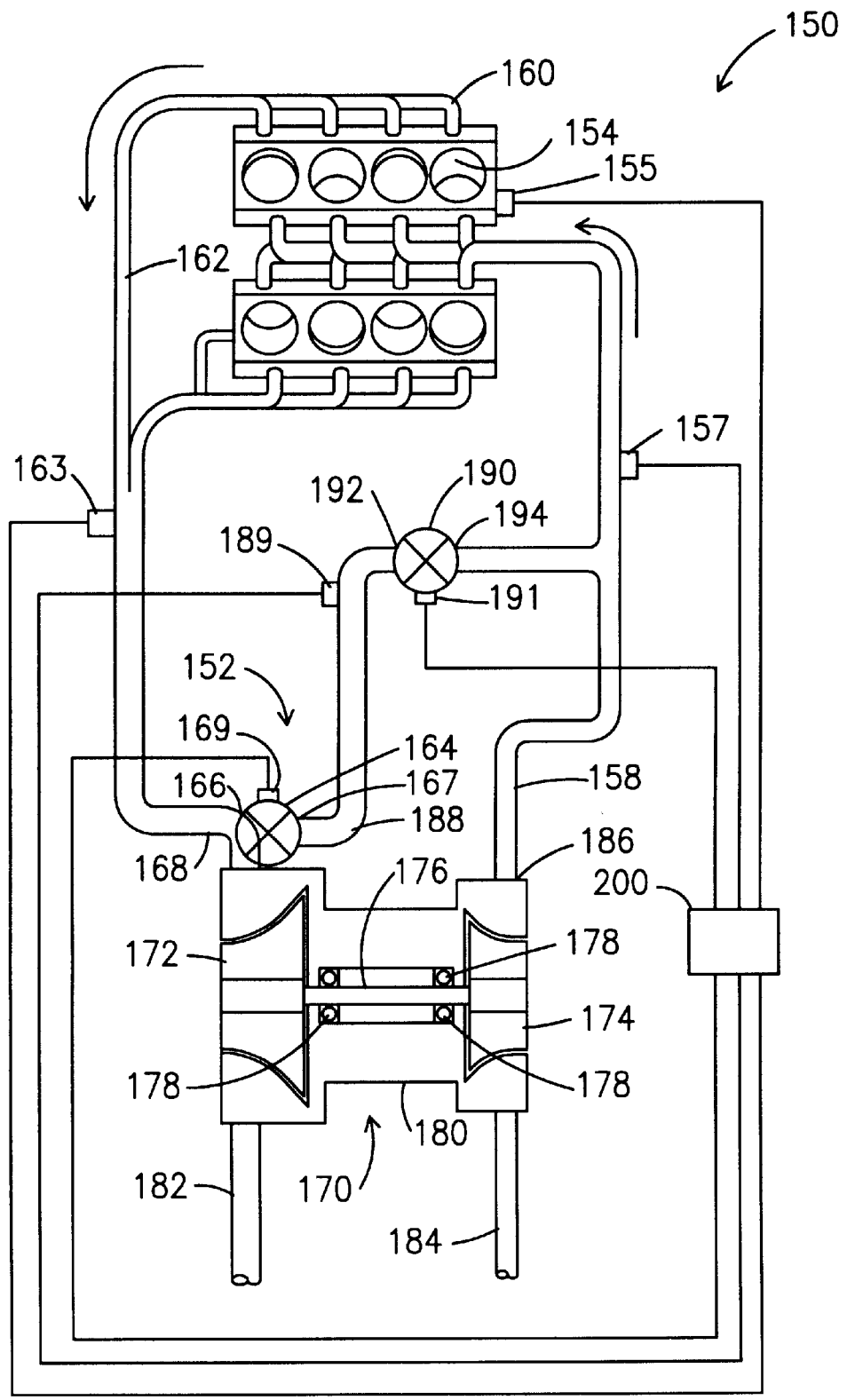
FIG. 8 is a schematic of a turbocharged internal combustion engine according to the present invention.

With reference now to FIG. 8, the operation of a preferred embodiment of the exhaust gas recirculation duct system of the present invention will be described. Turbocharged internal combustion engine 150 is shown with turbocharger 170 and exhaust gas recirculation duct system 152. One or more cylinders 154 are provided intake gas through intake manifold 156. Combustion of the fuel and intake gas within the cylinders 154 produces exhaust gas which exits cylinders 154 into exhaust manifold 160. The exhaust gas flows through exhaust gas manifold 160 and into exhaust gas duct 162. A turbine inlet duct 168 delivers the exhaust gas to the turbine 172 of turbocharger 170. Scoop valve 164 is disposed between turbine inlet duct 168 and exhaust gas recirculation duct 188. In the system of FIG. 8, an EGR valve 190 is optionally included in the system.

Exhaust gas not diverted by scoop valve 164 enters turbine 172 driving compressor 174 through rotor shaft 176. Rotor shaft 176 is supported by bearings 178 which are supported by turbocharger housing 180. Exhaust gas exits turbine 172 through duct 182.

Compressor 174 takes in intake gas provided by intake duct 184 and delivers compressed intake gas at compressor outlet 186. The compressed intake gas is then delivered to intake duct 158. Recirculated exhaust gas from EGR valve outlet 194 is mixed with the compressed intake gas and the mixture delivered to intake manifold 156.

With continued reference to FIG. 8, the operation of the system is controlled by an electronic control module 200 which is preferably a digital electronic controller having memory and a central processing unit. Alternatively, control unit 200 may be a programmable logic controller. Both controller types are well known in the art.

Various sensors in the system provide electrical signals to control unit 200 including pressure sensors 157, 163, and 189 which are respectively responsive to intake gas pressure, exhaust gas pressure and recirculated exhaust gas pressure. These sensors are any of those known in the art for generating electrical output signals in response to gas pressure. Control unit 200 also receives signals from sensors monitoring various engine operating parameters such as engine state, engine speed, engine temperature, outside temperature, etc. These sensors are generally represented at 155 in FIG. 8 and are any of the types commonly known in the art for performing such functions.

Based on the various engine operating parameters received from sensors at 155, along with signals from pressure sensors 157 and 163, electronic control unit 200 actuates EGR valve 190 via actuator 191 to deliver an appropriate amount of recirculated exhaust gas. Simultaneously, control unit 200 actuates scoop valve 164 through actuator 169 to maintain the required pressure at EGR valve inlet 192 for necessary for admission to the intake gas.

Actuators 191 and 169 are any of several well known in the art for operating movable valve elements. These may include electric stepper motors, hydraulic actuators, and the like.

When the pressure of the recirculated exhaust needs to be increased, scoop valve 164 is actuated to increase its opening to increase the volume of the diverted exhaust gas which increases the total pressure the inlet 192 of EGR valve 190. Similarly, when less pressure is required at EGR valve inlet 192, scoop valve 164 is closed correspondingly decreasing exhaust gas pressure at EGR valve 190.

Exhaust gas not needed to maintain pressure at EGR valve 190 is allowed to pass valve 164 and enter turbine 172.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, it is contemplated that the system ductwork may be sized or incorporate components of varying size so the appropriate metering and mixing of recirculated exhaust gas and intake gas may be achieved without the use of EGR valve 190. In such applications, the electronic control unit controls the exhaust gas mixing exclusively through the actuation of scoop valve 164.

What is claimed is:

1. An exhaust gas recirculation system for an internal combustion engine producing exhaust gas and accepting intake gas comprising:

a turbocharger for increasing the pressure of the intake gas to the engine, said turbocharger having a turbine and an inlet scroll in fluid communication with said turbine, said scroll including a port for diversion of a portion of the exhaust gas to the intake gas;

an exhaust gas recirculation duct attached to said scroll, said duct having an inlet in fluid communication with said port; and a scoop valve disposed between said port and said duct and moveable between a closed position to inhibit exhaust gas flow from said inlet scroll to said duct and an open position to divert a portion of the exhaust gas from said inlet scroll to said duct.

2. The exhaust gas recirculation system of claim 1 further comprising an exhaust gas recirculation valve with an inlet for receiving exhaust gas from said duct and to provide exhaust gas to the intake gas of the engine.

3. The exhaust gas recirculation system of claim 1 wherein said scoop valve includes:
   an elongated pivot shaft disposed between said scroll and said duct and having first and second ends including at least one free end;
   a valve member attached to said pivot shaft for pivotable rotation therewith, said valve member defining a blade element receivable in said port, said blade element configured for sealing engagement with said inlet of said duct when said valve is in said closed position; and
   a cap attached to said at least one free end of said shaft.

4. The exhaust gas recirculation system of claim 3 wherein said cap includes a seal to prevent leakage of the exhaust gas.

5. The exhaust gas recirculation system of claim 3 wherein said scoop valve further includes at least one sleeve for slidably receiving an end of said pivot shaft.

6. The exhaust gas recirculation system of claim 3 wherein said inlet scroll defines a first channel and said duct defines a second channel whereby said first and second channels combine to define a bore for receiving said pivot shaft and said at least one sleeve when said duct is attached to said scroll.

7. The exhaust gas recirculation system of claim 1 wherein one of said scroll or said duct includes a passageway and said scoop valve includes:
   a blade element disposed within said port and configured for sealing engagement with one of said port or said inlet of said duct when said scoop valve is in said closed position; and
   an actuating rod having a distal end attached to said blade element and a proximal end receivable in said passageway, and slidable within said passageway to move said blade element between said open position and said closed position.

8. The exhaust gas recirculation system of claim 7 further including a guide proximate said passageway for supporting said proximal end of said actuating rod, said guide including a seal to prevent leakage of exhaust gas from said passageway.

9. The exhaust gas recirculation system of claim 1 wherein said duct is integral with said inlet scroll.

10. An exhaust gas recirculation system comprising:
    an internal combustion engine accepting intake gas and producing exhaust gas;
    a turbocharger for increasing the pressure of the intake gas to the engine, said turbocharger having a turbine and an inlet scroll in fluid communication with said turbine, said scroll accepting exhaust gas from said engine;
    an exhaust gas recirculation duct attached to said scroll, for conducting a portion of said exhaust gas to said intake gas; and a scoop valve disposed between said scroll and said duct and moveable between a closed position to inhibit exhaust gas flow from said scroll to said duct and an open position to divert a portion of the exhaust gas from said scroll to said duct.

11. The exhaust gas recirculation system of claim 9 wherein said scroll includes a port for diversion of a portion of said exhaust gas and said duct includes an inlet in fluid communication with said port.

12. The exhaust gas recirculation system of claim 10 wherein said scoop valve is disposed between said port and said inlet.

13. The exhaust gas recirculation system of claim 10 further comprising an exhaust gas recirculation valve having an inlet for receiving said exhaust gas from said duct and to provide said exhaust gas to said intake gas.

14. An engine system comprising:
    an internal combustion engine producing exhaust gas and accepting intake gas at a first pressure, said engine having an intake manifold and an exhaust manifold;
    a turbocharger having an inlet scroll in fluid communication with said exhaust manifold, said scroll accepting said exhaust gas from said engine;
    an exhaust gas recirculation duct attached to said scroll and in fluid communication with said intake manifold, for conducting a portion of said exhaust gas to said intake manifold at a second pressure;
    a scoop valve disposed between said scroll and said duct and moveable between a closed position to inhibit exhaust gas flow from said scroll to said duct and an open position to divert a portion of the exhaust gas from said scroll to said duct;
    a first sensor for providing a first signal corresponding to said first pressure;
    a second sensor for providing a second signal corresponding to said second pressure; and
    a controller responsive to said first and said second signals, and actuating said scoop valve to increase said second pressure so that said second pressure is greater than said first pressure.

15. The engine system of claim 14 further including an exhaust gas recirculation valve having an inlet for receiving exhaust gas from said duct and to provide exhaust gas to said intake manifold, said exhaust gas recirculation valve being controlled by said controller based on said first and second pressures.

16. The engine system of claim 14 wherein said controller includes a computer.

17. The engine system of claim 14 wherein said duct is integral with said scroll.

18. A turbocharger for an internal combustion engine producing exhaust gas, and accepting intake gas comprising:
    a turbine having an inlet scroll to receive the exhaust gas, said scroll having a port for diversion of a portion of exhaust gas to the intake gas;
    an exhaust gas recirculation duct attached to said scroll, for conducting a portion of said exhaust gas to said intake gas;
    a compressor driven by said turbine to pressurize the intake gas;
    a scoop valve disposed between said scroll and said duct and moveable between a closed position to inhibit exhaust gas flow from said scroll to said duct and an open position to divert a portion of the exhaust gas from said scroll to said duct; and
    a housing supporting said turbine, and said compressor.

19. The turbocharger of claim 18 wherein said scroll is integral with said housing.

20. The turbocharger of claim 18 wherein said duct is integral with said scroll.

* * * * *